United States Patent [19]

Maughmer

[11] 4,123,849
[45] Nov. 7, 1978

[54] MINIATURE NORTH REFERENCE UNIT
[75] Inventor: Robert W. Maughmer, Calabasas Park, Calif.
[73] Assignee: Litton Systems, Inc., Woodland Hills, Calif.
[21] Appl. No.: 765,239
[22] Filed: Feb. 3, 1977

Related U.S. Application Data
[63] Continuation of Ser. No. 673,109, Apr. 2, 1976, abandoned.

[51] Int. Cl.$^2$ ............................................. G01C 19/34
[52] U.S. Cl. ...................................................... 33/320
[58] Field of Search ............... 33/318, 320, 324, 327 R

[56] References Cited
U.S. PATENT DOCUMENTS 794,654  7/1905  Kaempfe .................................. 33/324
3,279,086  8/1963  Schlitt et al. ............................ 33/324
3,283,409  11/1966  Rothe et al. ............................. 33/320

Primary Examiner—Steven L. Stephan
Attorney, Agent, or Firm—Harold E. Gillmann

[57] ABSTRACT

The gyroscope operated in a strapdown mode and mounted on a float assembly with its spin axis extending in a vertical direction. The float assembly is free to rotate about any horizontal axis but is constrained from rotating about the vertical to assure an accurate azimuthal reference between the gyroscope and the case in which it is floating. The angle between an azimuthal reference line of the gyroscope and true north is obtained by measuring the amount of torque required to counteract precession of the gyroscope about a horizontal sensitive axis which would occur because of the horizontal component of the rate of rotation of the earth.

33 Claims, 12 Drawing Figures

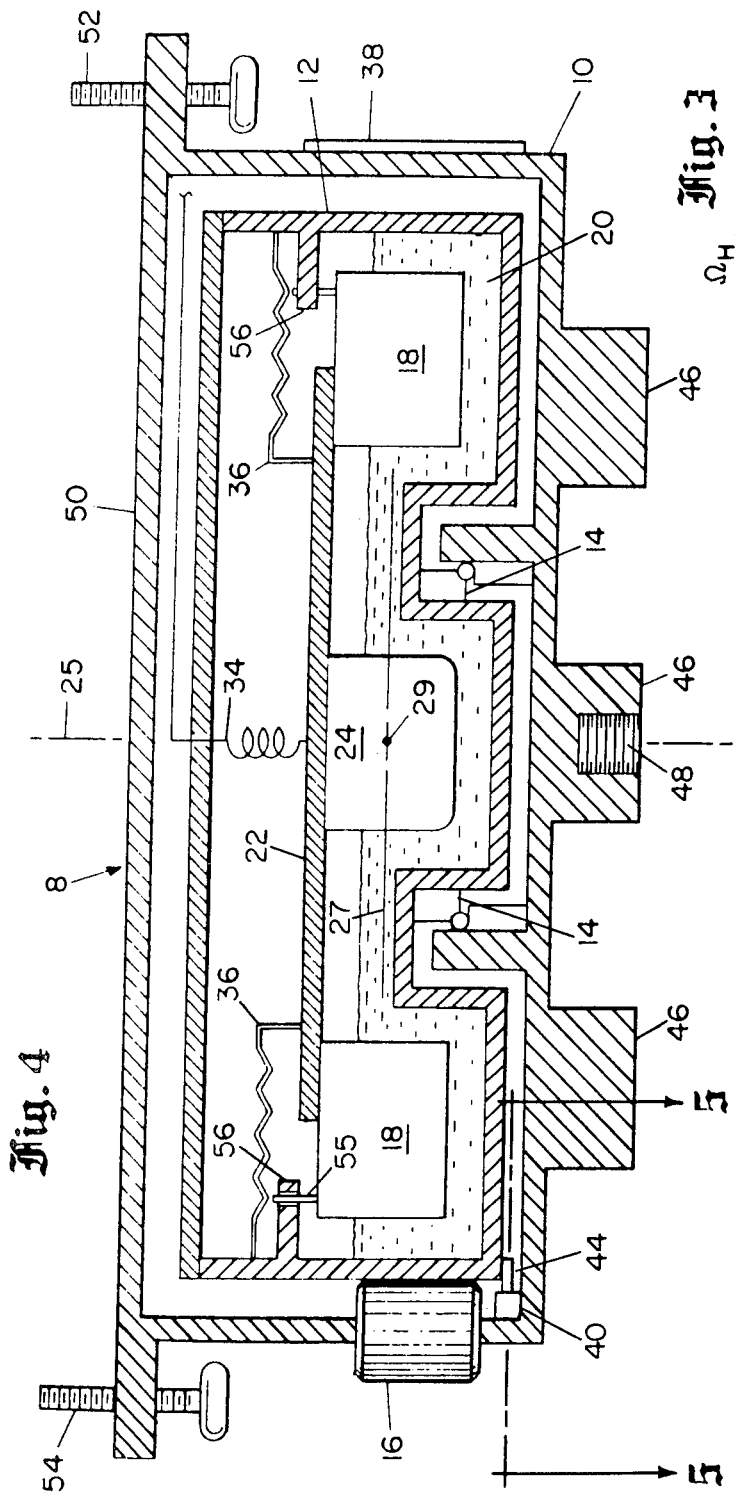

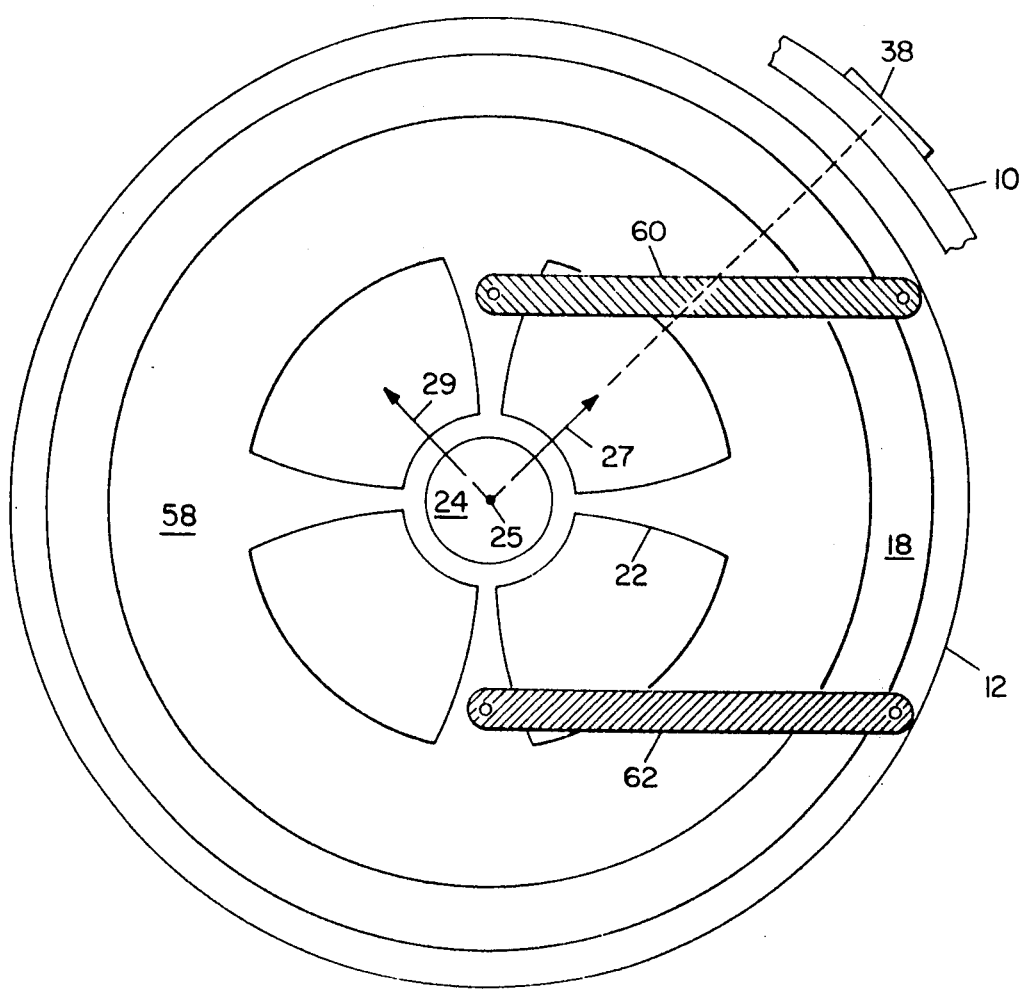

MINIATURE NORTH REFERENCE UNIT

CROSS-REFERENCE TO A RELATED APPLICATION

This application is a continuation of Application Ser. No. 673,109, filed Apr. 2, 1976 by me and now abandoned.

BACKGROUND OF THE INVENTION

This invention is in the field of true north reference devices, preferably of the self-leveling gyroscopic type.

Numerous types of north-seeking gyrocompasses are known in the art. One type of north-seeking gyrocompass is a pendulous gyroscope having its spin axis oriented horizontally. This type of gyroscope tends to precess under the rotation of the earth to align its spin axis with true north. In such a mechanization, the gyroscope is allowed to oscillate back and forth across a north-south meridian. However, the precision with which the direction of true north may be obtained from such a device is limited by error torques, such as friction in the suspension of the gyroscope, which torque the gyroscope about the vertical axis and hold the gyroscope off north. The magnitudes of these torques cannot be easily determined and in many applications are usually assumed to be constant. Also, because of the oscillations about true north inherent in this type of mechanization, the minimum period of time during which an indication of true north can be obtained is limited to the period of at least one oscillation. The length of this period is also dependent on the initial misalignment of the spin axis with north.

Another type of north-seeking gyrocompassing system is described in U.S. Pat. No. 3,222,795. The device disclosed therein includes an inertial platform having three gyroscopes. The platform is slaved to local horizontal orientation by erection servo-mechanisms. Also, the sensitive axis of one of the gyroscopes must be initially aligned in an approximately east-west direction by using a compass or the like. The requirement for an inertial platform equipped with gyroscopes and servo-mechanisms and associated electronics, and also the requirement for an external compass would contribute greatly both to the cost and to the size of this device.

SUMMARY OF THE INVENTION

The gyrocompass of the invention overcomes the above and other disadvantages of the prior art by providing a gyroscope which is operated in a strapped-down mode on a float assembly. The float assembly has freedom to pivot about any horizontal axis but it is constrained from rotating about the local vertical axis. The gyroscope is mounted on the float assembly with its spin axis oriented in a substantially vertical direction. Constraint of the float in azimuth assures an accurate azimuthal reference between the gyroscope and the casing or housing in which it is floating. Freedom to rotate about any horizontal axis assures that the gyroscope spin axis can remain nominally vertical and that no undesired rates about a horizontal axis are transmitted to the gyroscope.

The angle between an azimuthal reference line of the gyroscope and true north is obtained by measuring the magnitude of torque required to counteract precession of the gyroscope about a horizontal sensitive axis which would occur because of the horizontal component of the rate of rotation of the earth. This counteracting torque is measured twice with the horizontal sensitive axis of the gyroscope oriented in any two different directions about the local vertical which differ by a known angle. Preferably, the gyroscope is a two-degree-of-freedom gyroscope having mutually orthogonal horizontal sensitive axes and the measurements of counteracting torques are made simultaneously.

A gyroscope mounted on a float constrained to prevent rotation in azimuth is decoupled from angular input rates about horizontal axes to which the housing of the gyrocompass may be subjected when operating from a tripod or any other portable base. Mounting the gyroscope on a float assembly which conforms to the surface of a flotation fluid also results in maximum sensitivity of the two mutually orthogonal sensitive axes to the horizontal component of earth rate, because the float maintains the spin axis of the gyroscope parallel to the local gravity vector. Thus, undegraded performance of the gyrocompass is assured even though the housing of the gyrocompass may be misleveled by as much as several degrees.

In the performance of the method of the invention, the counteracting torque required to prevent precession is applied over a unit time period, with the sensitive axes of the gyroscope oriented in any two mutually orthogonal directions. Next, the azimuth orientation of the float assembly with respect to the housing is accurately displaced by 180°. The second measurements of the counteracting torques about the two sensitive axes are then made. By measuring the components of the horizontal earth rate in a first orientation and then immediately afterwards in an orientation displaced by 180° with respect to the first orientation, the measurements can be combined in solving for the angle between the direction of a sensitive axis of the gyroscope and true north. Combining the measurements made in the two orientations effectively doubles the measured components of the horizontal earth rate and cancels correlated disturbances on the gyroscope, such as bias drifts and nonorthogonality of the gyroscope axes with respect to the gravity vector. Because the errors are cancelled, a gyroscope having only a short-term stability may be used.

It is therefore an object of the invention to provide a north determining device that may be oriented in any horizontal direction without degradation in accuracy or increase of settling time;

It is also an object of the invention to provide a north determining device which does not require knowledge of latitude to determine the direction of true north;

It is a further object of the invention to provide a north determining device which may also be utilized to determine the latitude of a point on the surface of the earth;

It is another object of the invention to provide a north determining device which will determine the direction of true north in a minimum amount of time;

It is a further object of the invention to provide a low cost north determining device;

It is still another object of the invention to provide a north determining device which requires minimal electrical power for operation;

It is yet another object of the invention to provide a lightweight, portable north determining device; and It is a still further object of the invention to provide a highly accurate north determining device.

DESCRIPTION OF THE DRAWINGS

The invention will become better understood from the following detailed description of one embodiment thereof, when taken in conjunction with the drawings, wherein:

FIGS. 1, 2 and 3 are vector diagrams illustrating the relationship between physical quantities measured by the gyrocompass and the reference orientation of the gyrocompass;

FIG. 4 is a cross sectional view of one embodiment of a sensor assembly;

FIGS. 5 and 6 are partial cut-away detail views more closely illustrating certain features of the embodiment of FIG. 4;

FIG. 7 is a top view of an alternate float assembly which may be in the embodiment shown in FIG. 4

THEORY OF THE INVENTION

Figure 1:
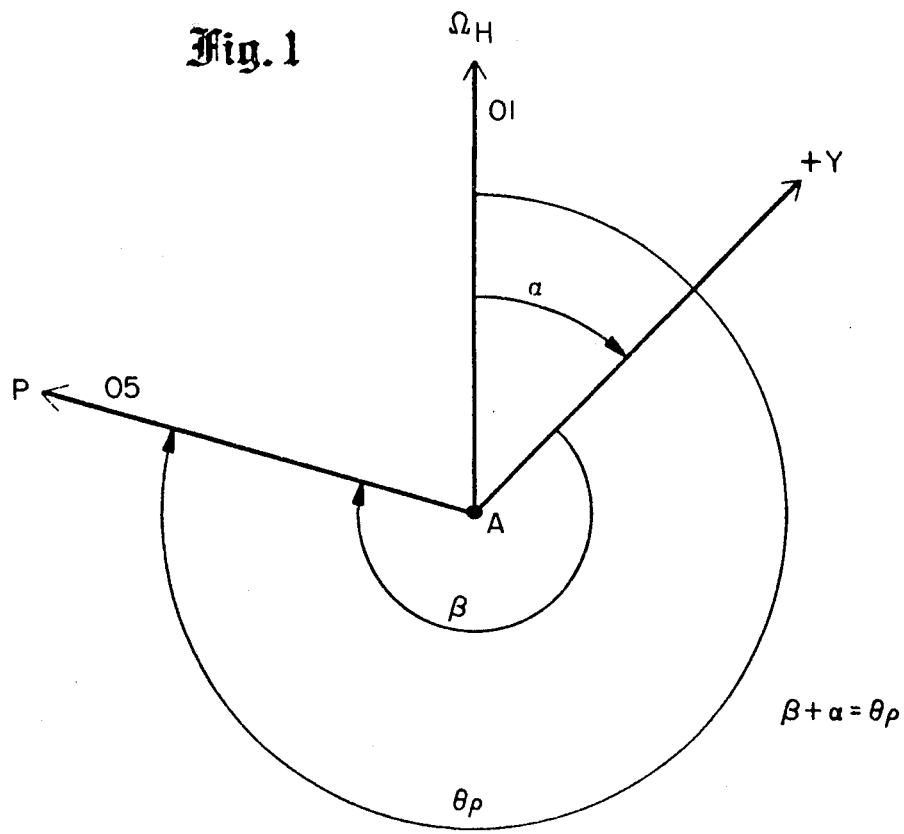

FIG. 1 illustrates the problem solved by a device embodying the invention. It is desired to find the azimuth of point P measured from point A with respect to true north. Axis 01 is the direction of true north from point A. Axis +Y is a reference direction in the horizontal plane which is established by the gyrocompass. Axis +Y may extend in any horizontal direction. Angle $\alpha$ is the angle between axis +Y and true north and is measured by the device. Direction line AP is a line of sight direction from point A to point P. Angle $\beta$ is the angle between axis Y and direction line AP. Angle $\beta$ may be measured by an external device such as a theodolite. Angle $\theta_p$ is the bearing or azimuth angle of point P measured from point A with respect to true north. It can be seen that $$\theta_p = \beta + \alpha \tag{1}$$

Figure 2:
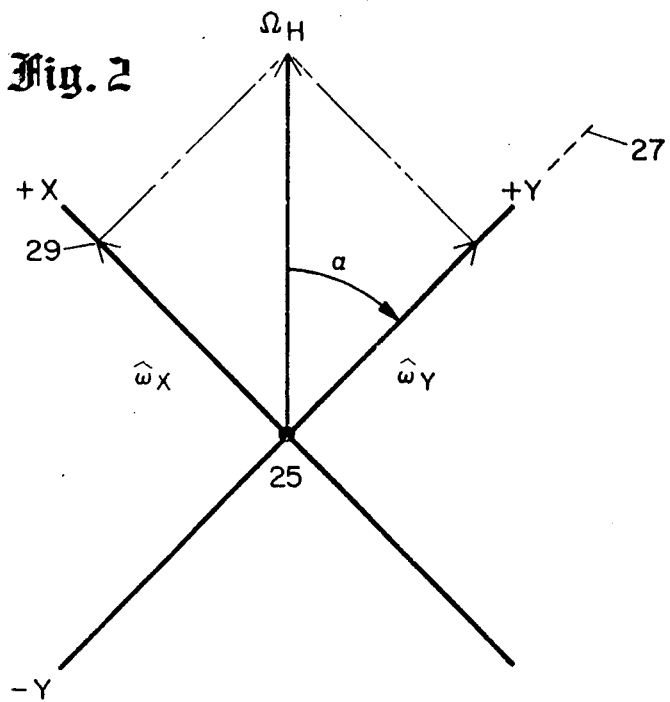

The angle $\alpha$ is obtainable by measuring a horizontal component of the angular rate of rotation of the earth at point A about the sensitive axis of an angular rate sensing device. The angular rate sensing device is preferably a gyroscope which is constrained to prevent rotation of the sensitive axis about the local vertical. More particularly, the angular rate of rotation of the earth about its axis, which is a vector extending in the direction of the axis of the earth from the north pole, is uniquely experienced at each latitude line of the surface of the earth. The earth rate vector at any point of the earth may be resolved into a horizontal and a vertical component. The magnitude of the horizontal component of the earth rate vector varies from the equator to each of the poles as a secant function of the latitude. It is the horizontal component of the earth rate vector which is measured in accordance with the invention to determine the direction of the axis Y with respect to true north. The horizontal component of the earth rate vector will be oriented in the direction of true north. The components of the horizontal earth rate are measured along two mutually orthogonal axes. The angle between either one of these axes and north, i.e., the direction of the horizontal earth rate vector, is obtained from these components. In FIG. 2 it may be seen that these components comprise the sides of a right triangle of which the horizontal component of earth rate is the hypotenuse. The angle between one of the measured components and north may be obtained from either an arc tangent or an arc cotangent relationship.

The components of the horizontal vector of earth rate may be measured either simultaneously or serially. In the illustrated embodiment the components are simultaneously measured by measuring the magnitude of torque required to prevent angular displacement of a two-degree-of-freedom gyroscope about its horizontally oriented, mutually orthogonal sensitive axes. If the effect of earth rate were not cancelled, the gyroscope would precess about its sensitive axes. However, there are other ways of measuring the components of the horizontal earth rate vector which do not require the use of a spinning gyroscope but which are within the scope of the invention. Some of these other devices are described infra.

Expressing these principles in the form of equations results in:

$$\hat{\omega}_y = \Omega_H \cos \alpha \tag{2}$$

$$\hat{\omega}_x = \Omega_H \sin \alpha \tag{3}$$

$$\frac{\Omega_H \sin \alpha}{\Omega_H \cos \alpha} = \frac{\hat{\omega}_x}{\hat{\omega}_y}$$

$$\tan \alpha = \frac{\hat{\omega}_x}{\hat{\omega}_y} \tag{4}$$

$$\alpha = \arctan\left(\frac{\hat{\omega}_x}{\hat{\omega}_y}\right) \tag{5}$$

wherein $\Omega_H$ = the horizontal component of earth rate;
$\alpha$ = the angle between true north and the reference (Y) axis;
$\hat{\omega}_x, \hat{\omega}_y$ = the rate of angular displacement about the X and Y axes measured by an angular rate or angular displacement sensing device, alternatively $$\cot \alpha = \frac{\hat{\omega}_y}{\hat{\omega}_x}$$

$$\alpha = \operatorname{arc cot} \frac{\hat{\omega}_y}{\hat{\omega}_x} \tag{6}$$

A device embodying the invention may also be utilized to determine latitude of a point on the surface of the earth. From equations 2 and 3 it may be seen that $$\omega_H = \frac{\hat{\omega}_y}{\cos \alpha} = \frac{\hat{\omega}_x}{\sin \alpha} \tag{7}$$

where $\alpha$ is obtained from equation (5).

To avoid mechanizing a division by an expression which may approach zero, the horizontal earth rate vector may be implemented as:

$$\Omega_H = \frac{\hat{\omega}_x}{\sin \alpha} \text{ where } \alpha > 45°$$

-continued $$= \frac{\hat{\omega}_y}{\cos \alpha} \text{ where } \alpha \leq 45°$$

The latitude of a point on the surface of the earth has the following relationship with the earth rate vector and its horizontal component.

$$\Omega_H = \frac{\Omega}{\cos \lambda} \quad (8)$$

where $\Omega$ = the earth rate vector.
$\Omega_H$ is the horizontal component of $\Omega$.
$\lambda$ = the latitude of point A on the surface of the earth.

$$\cos \lambda = \frac{\Omega}{\hat{\omega}_y/\cos \alpha} \text{ or } \cos \lambda = \frac{\Omega}{\hat{\omega}_x/\sin \alpha}$$

$$\lambda = \arccos\left[\frac{\Omega \cos \alpha}{\hat{\omega}_y}\right] \quad (9)$$

Equations (5) and (6) relate to special cases where the X and Y sensitive axes are mutually orthogonal. The principle of the invention is, however, equally applicable to the situation where measurements of components of the horizontal earth rate vector are made about two sensitive axes which are not mutually orthogonal but which differ from each other in direction by a known angle $\gamma$ in a horizontal plane. FIG. 3 illustrates the more general case. In FIG. 3 the angle Alpha ($\alpha$) is the angle between true north and the Y sensitive axis. The derivation of the angle Alpha from two horizontal components of the horizontal earth rate vector, Omega$_X$ ($\omega_x$), and Omega$_Y$ ($\omega_y$), is set foth infra in equations (10) through (15).

$$\alpha + \epsilon = \gamma \quad (10)$$

$$\epsilon = \gamma - \alpha \quad (11)$$

$$\hat{\omega}_y = \omega_H \cos \alpha$$

$$\hat{\omega}_x = \Omega_H \cos \epsilon$$

$$\hat{\omega}_x = \Omega_H \cos (\gamma - \alpha) \quad (12)$$

$$\frac{\hat{\omega}_x}{\hat{\omega}_y} = \frac{\cos\gamma\cos\alpha}{\cos\alpha} + \frac{\sin\gamma\sin\alpha}{\cos\alpha} \quad (13)$$

$$\frac{\hat{\omega}_x}{\hat{\omega}_y} = \cos\gamma + \sin\gamma\tan\alpha \quad (14)$$

$$\alpha = \arctan\left(\frac{\frac{\hat{\omega}_x}{\hat{\omega}_y} - \cos\gamma}{\sin\gamma}\right) \quad (15)$$

DESCRIPTION OF THE PREFERRED EMBODIMENT

In FIG. 4 there is shown a cross-sectional view of one embodiment of a sensor assembly 8. An outer frame 10 supports a rotatable inner housing 12 on ball bearings 14. Inner housing 12 is rotatable through at least 180° by thumb wheel 16. Inner housing 12 is a sealed unit, preferably hermetically sealed.

A toroidally-shaped float 18 is supported internally of the inner housing 12 by fluid 20. Fluid 20 is preferably halocarbon fluid or any other suitable fluid including mercury, water or polysiloxane fluids. A bridging element or lid 22 is secured to the top of float 18 for supporting angular rate sensing device 24. The diameter of float 18 is selected to produce an adequate restoring moment or pendulosity in a selected fluid.

Figure 12:
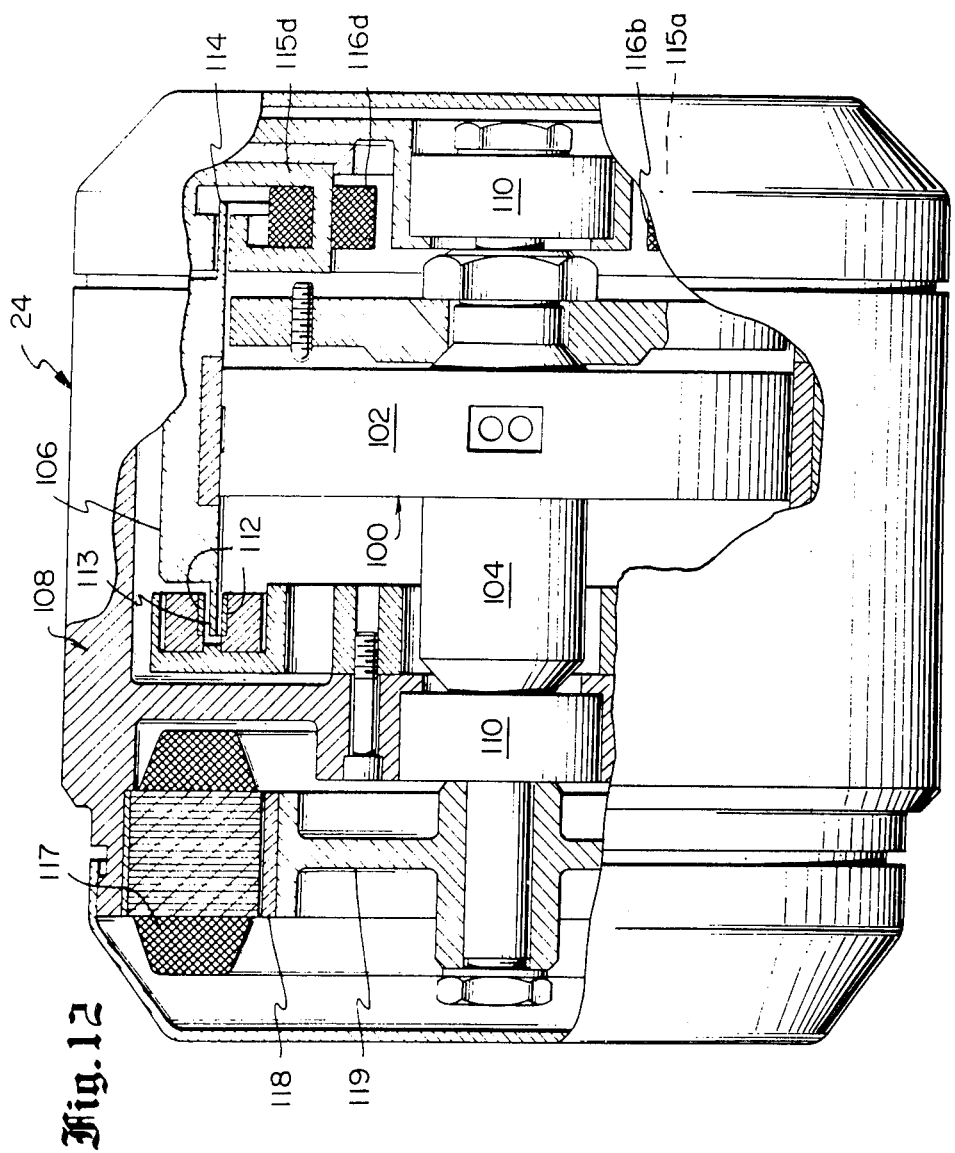
FIG. 12 is a cross sectional view of a prior art gyroscope.

Angular rate sensor 24 is preferably a gyroscope with a rotating inertial wheel as shown in FIG. 12, for example and in U.S. Pat Nos. 3,678,764; 3,614,894; 3,354,726, but other types of angular rate sensing devices may be used, such as a ring laser gyroscope or a nuclear magnetic resonance gyroscope as shown, for example, in U.S. Pat. Nos. 3,433,568 and 3,103,623 respectively. A gyroscope may be preferred because it is the smallest angular rate sensor currently available and having the desired performance characteristics.

In the illustrated embodiment where angular rate sensing device 24 is a gyroscope, the gyroscope is oriented with its spin axis 25 in a substantially vertical direction. Small angular displacements of inner housing 12 and outer frame 10 about any horizontal axis will not disturb the direction of the spin axis. The fluid will continue to have a horizontal surface, bridging element 22 will be maintained in a horizontal orientation and the spin axis 25 of the gyroscope, which is oriented at a constant right angle with respect to element 22 will continue to extend in a substantially vertical direction.

The gyroscope includes a pickoff (not shown) that senses angular rates or angular displacement about a sensitive axis 27 and another pickoff (not shown) that senses angular rates or angular displacements about a sensitive axis 29. Axes 25, 27 and 29 are mutually orthogonal. The gyroscope also includes a torquer (not shown) and a second torquer (not shown) for precessing the gyroscope about sensitive axes 29 and 27, respectively. Each pickoff is used to monitor angular displacement of the inertial wheel with respect to the casing of the gyroscope and to produce an electrical signal proportional to this displacement. A pickoff converts mechanial motion within the gyroscope into an electrical signal with adequate sensitivity to operate associated circuitry and has sufficient resolution to detect very small increments of displacement and an electrical null position that is clearly defined and repeatable. The function of each torquer is to produce a mechanical torque proportional to an electrical signal. This torque is used to position the spin axis of the gyroscope. A constant orientation of the gyroscope is maintained by torquing the gyroscope to null the corresponding pickoff signal. This aspect of the operation of a gyroscope is described in more detail below.

Electrical connections to the angular rate sensing device 24 are made via a lead 34.

A diaphragm 36 is connected between bridging element 22 and the inside wall of inner housing 12 to prevent the angular rate sensing device 24 from rotating about its vertical axis. Thus, the angular rate sensing device may rotate through small angles about any horizontal axis but is constrained from rotating about the vertical.

A mirror 38 is provided as shown to supply a means for establishing a reference horizontal direction with respect to the direction of one of the sensitive axes 27 or 29. In FIG. 4, sensitive axis 27 is orthogonal with respect to the surface of mirror 38. Thus, a reference direction may be established with respect to sensitive axis 27 by the use of an external optical device, such as a theodolite, by auto collimation or auto reflection techniques. For auto collimation, an external theodolite (not shown) projects a beam of light onto the mirror. The theodolite is positioned so that the reflected beam of light is observed on the crosshair of the theodolite. In this manner, the direction of the sensitive axis 27 provides a reference azimuth angle to the theodolite. Other azimuth angles with respect to this reference direction angle of sensitive axis 27 can be obtained by rotating the theodolite in azimuth. Solution of equation (1) provides a measurement of an azimuth angle with respect to true north.

In FIG. 5, spring-like member 40 having a detent 42 and stop pins 44 constitute a means for maintaining a desired azimuthal relationship between inner housing 12 and outer frame 10. In operating the device, inner housing 12 is rotated through angles of 90°, 180° and 270° with respect to an initial azimuth position. A plurality of stop pins 44 appropriately spaced around the circumference of inner housing 12 provide a possibility of known angular positions of inner housing 12 with respect to the azimuth orientation of member 40 on outer frame 10. Inner housing 12 is rotated with thumb screw 16 so that a stop pin 44 slides along member 40. When a stop pin 44 is an alignment with detent 42, the spring action of member 40 forces the pin unto the detent.

Surface 46 is a flat surface for mounting the instrument to a tripod or other base. Outer frame 10 has a threaded aperture 48 in surface 46 for mounting the instrument to the tripod. Surface 50 is a flat surface for supporting a theodolite on the instrument as an alternate read-out device. Screws 52 and 54 function to secure the theodolite to the instrument. As shown in FIGS. 4 and 6, pins 55 on float 18 fit into holes in a bracket 56 to provide a protective stop limiting translational and rotational motion about axis 25 when the gyrocompass is not in use.

FIG. 7 is a top view of an alternate float assembly configuration which may be substituted for float 18 and diaphragm 36. Float 58 of FIG. 7 is connected to housing 12 by restraining bars 60 and 62. Restraining bars 60 and 62 restrain motion of the float in rotation about the vertical but bend and twist to permit pivoting motion about a horizontal axis.

Figure 8:
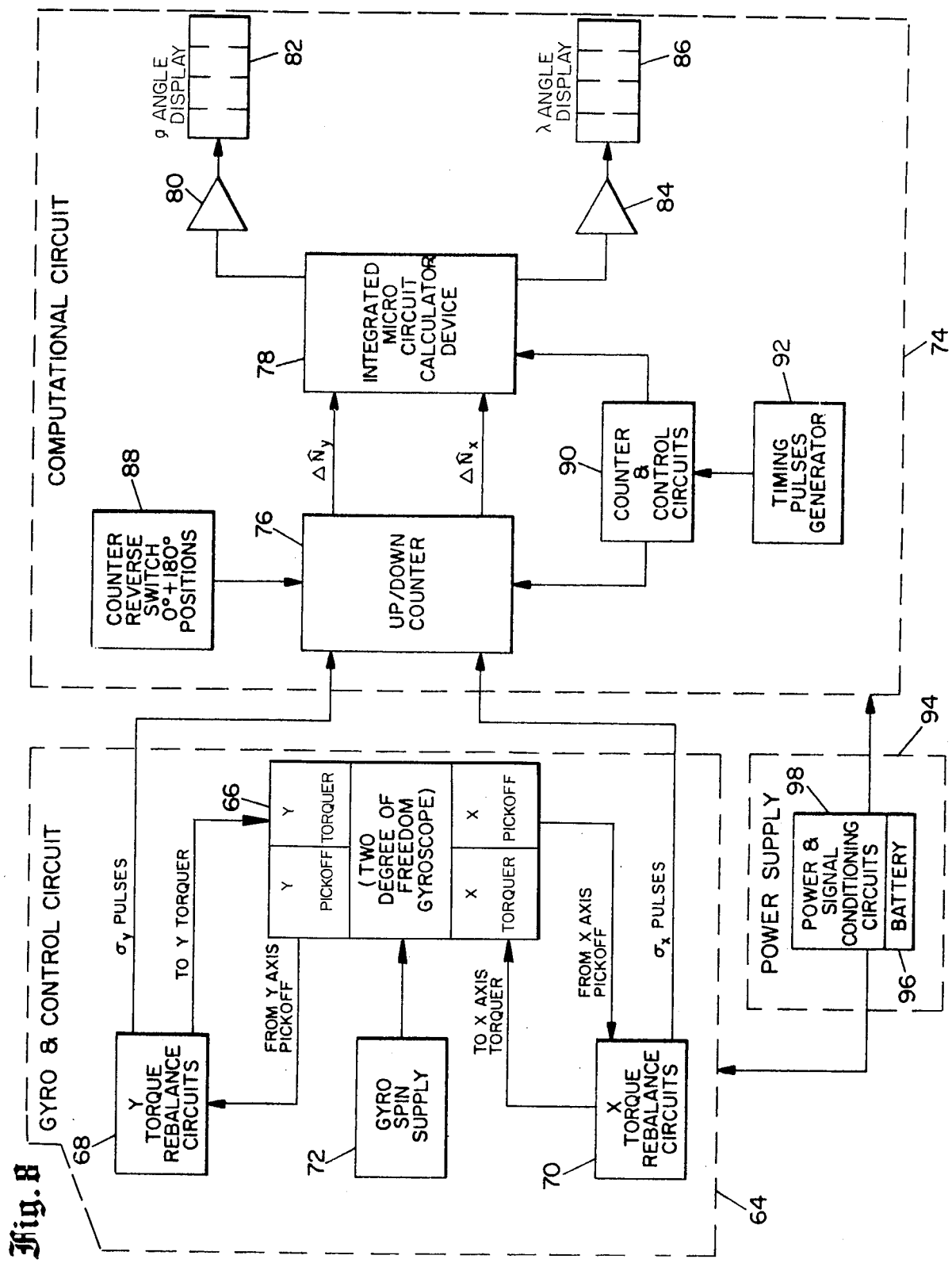
FIG. 8 is a functional block diagram of the preferred embodiment of the gyrocompass including computational circuitry.

In FIG. 8, there is shown a block diagram of circuitry for computing the angle between true north and a reference direction of the instrument. In the illustrated embodiment the reference direction is the direction of one of the two sensitive axes of the gyroscope. Either sensitive axis may be utilized as the reference direction. The gyroscope and its control device 64 comprises a two-degree-of-freedom gyroscope 66, a Y torque rebalance loop 68, an X torque rebalance loop 70 and a spin power supply 72. Gyroscope 66 may be a tuned rotor gyroscope such as the one disclosed in U.S. Pat. No. 3,678,764 or in U.S. Pat. No. 3,943,778. The gyroscope parameters to be optimized for this embodiment of the invention are small size, low power consumption, good short term bias stability and low bias temperature sensitivity, incorporated into a low cost unit.

Because the spin axis of gyroscope 66 is maintained substantially vertical by float 18 within inner housing 12, the sensitivity of the gyroscope to gravity is not critical. Also, for tuned rotor gyrsocopes there is no effective mass unbalanced sensitivity for accelerations along the spin axis. This feature of a tuned rotor gyroscope makes it especially suitable for use in an embodiment of the invention. A tuned rotor gyroscope has sensitivity to acceleration only for accelerations perpendicular to its spin axis. Since there is no such acceleration in the operation of this embodiment of the invention, there is no need for precise adjustment of mass unbalance sensitivity or control of the mass unbalance temperature sensitivity of the gyroscope. Other parameters which should be optimized in selecting a gyroscope are torquer scale factor, which may be tailored for pulse torquing, low temperature operation and rugged structural characteristics to withstand the rigors of being transported about.

X and Y torque rebalance loops 68 and 70 are identical circuits for cancelling angular displacement of the outer frame 10 of the gyroscope 66 about its sensitive axes 27 and 29. A torque rebalance loop is shown and described in U.S. Pat. No. 3,062,059. When the instrument is operated in a stationary position and mounted on a tripod, the only external angular rate input which will be sensed by the gyroscope is that angular rate which is due to the rotation of the earth. The mutually orthogonal substantially horizontal sensitive axes will each be in the direction of a component of the horizontal earth rate vector. The gyroscope will attempt to precess about its sensitive axes as a function of the magnitude of the two components of the horizontal earth rate vector along sensitive axes 27 and 29 and will do this independently of the direction of the axes 27 and 29 with respect to true north. A pickoff excitation voltage excites the primaries of the pickoff coils of the gyroscope. As the gyroscope case rotates relative to the inertial wheel, a pickoff signal is developed. The pickoff signal is coupled to a corresonding torque rebalance loop where pulse torquing signals are developed. The pulse torquing signals are applied to the corresponding torquer of the gyroscope thereby precessing the gyroscope, i.e., inertial wheel, in the same direction of the earth rate component about a particular sensitive axis. Thus, the inertial wheel of the gyroscope will be held motionless about a sensitive axis wih respect to case fixed coordinates of the gyroscope. The pickoff signal is nulled and the number of digital pulses in the torquing signals per unit time required to counteract precession due to a component of the horizontal earth rate is a measure of the magnitude of that component. Since the magnitude of the component of earth rate will vary by a known trigonometric function from the magnitude of the total horizontal component of earth rate, and since the horizontal component of earth rate is oriented in the direction of true north, the angle between a sensitive axis and true north may be calculated from the number of counteracting digital pulses per unit time.

Computational circuit 74 comprises an up/down counter 76, integrated circuit calculator device 78, amplifier 80, alpha angle display 82, amplifier 84, latitude angle display 86, a counter reversing switch 88, counter 90 and timing pulse generator 92.

OPERATION OF THE PREFERRED EMBODIMENT

In considering the operation of the illustrated embodiment, assume that axis 25 is substantially aligned in the vertical direction, axis 27 in the Y axis of the gyroscope 66 and axis 29 is the X axis of gyroscope 24, i.e., 66 in FIG. 8. As shown in FIG. 2, colineal axes Y and 27, and colineal axes X and 29 may extend in any horizontal direction.

The angle between the sensitive axis of an angular rate sensing device and true north may be found by measuring the angular rate sensed about a horizontal, motionless sensitive axis and then measuring the angular rate sensed about a horizontal, motionless sensitive axis in a direction which is orthogonal to the direction in which the first measurement was made. The measuring device may have a single sensitive axis whose orientation is rotated between the first and second measurements or it may have two mutually orthogonal sensitive axes in which case the measurements can be simultaneously made. The angular rates sensed by the device are the components of the horizontal rate of the earth's rotation about its axis as defined in equations (2) and (3). From the measured components $\hat{\omega}_x$ and $\hat{\omega}_y$, it is possible to compute the angles between the sensitive axes and true north as shown in equations (5) and (6).

Figure 9:
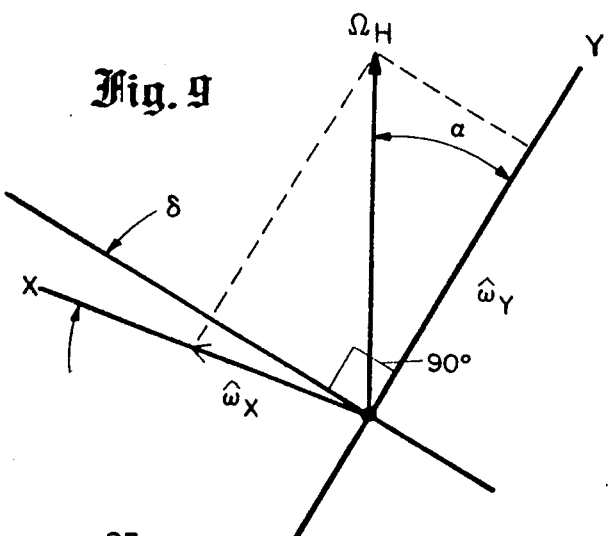
FIGS. 9, 10 and 11 are vector diagrams illustrating possible misorientations of the reference axes of the sensor assembly.
Figure 10:
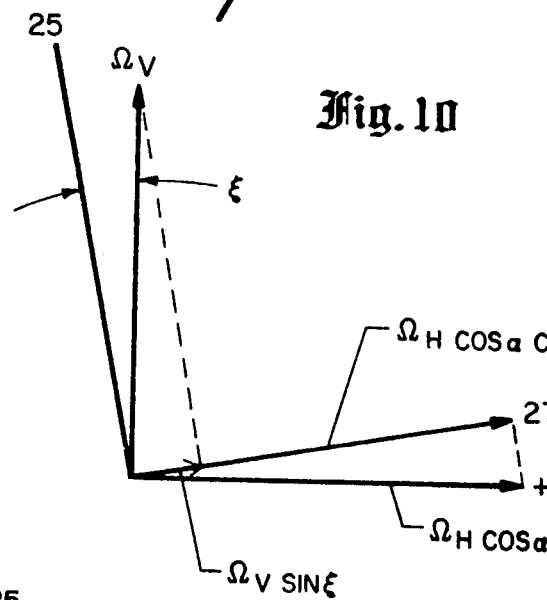
Figure 11:
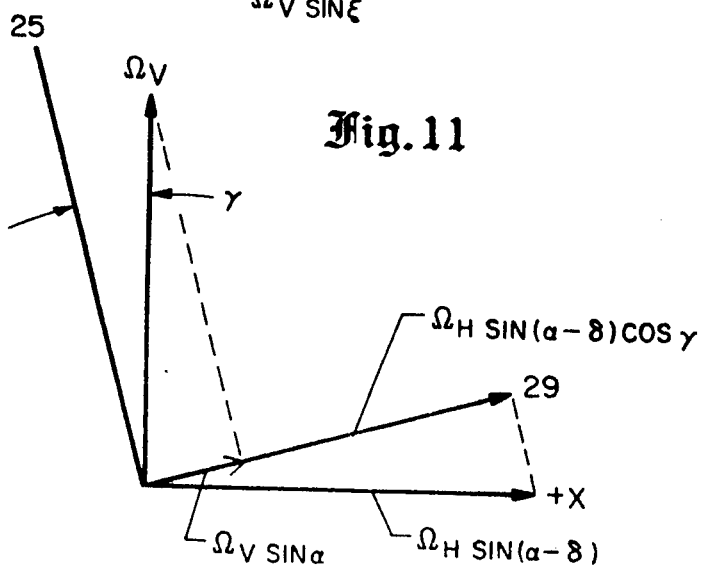

In making these measurements with the illustrated embodiment of the invention the equations are more complex and the procedure is expanded to eliminate significant error sources. FIGS. 9, 10 and 11 illustrate possible significant sources of error which may adversely affect the calculated angles between the sensitive axes and true north. FIGS. 9, 10 and 11 show the horizontal component of earth rate, the angle $\alpha$ and the X and Y sensitive axes, as defined for FIGS. 1 and 2. FIGS. 10 and 11 show the vertical component of the rate of rotation of the earth, $\Omega_V$. FIG. 9 shows a possible misalignment between the Y and the X sensitive axes which is illustrated as the angle $\delta$. Misalignments of axes shown in the drawings are exaggerated for the purpose of illustration.

FIG. 10 illustrates a tilt angle $\xi$ due to a tilting of the spin axis 25 in the Y direction. FIG. 11 illustrates a tilt angle $\gamma$ of the spin axis in the X direction. The angular misalignments are exaggerated for purposes of illustration and in practice these angular misalignments would be small but significant in terms of the accuracy of the calculated angle $\alpha$.

Another possible source of error is an inherent bias in the gyroscope. More particularly, any inherent tendency of the gyroscope to drift about its sensitive axes could not be distinguished by the pickoff signal from precession caused by a component of the horizontal rate of rotation of the earth. Any such drift would be counteracted by a torquing signal in the manner discussed above. Thus, unless a gyroscope bias or inherent drift is compensated, the torquing signal will be in error as a function of the magnitude of drift of the gyroscope.

To compensate for the effect of any gyroscope drift the measurements of the components of the horizontal rate of rotation of the earth, as defined in equations (2) and (3) are measured once with the X and Y sensitive axes in any first horizontal orientation and then a second time with the direction of the X and Y sensitive axes reversed by 180°. It is to be understood, however, that a device which operates according to equation (5) or (6) without making the second set of measurements with the sensitive axes reversed is also within the scope of the invention.

The following equations (16) through (28) show how the expanded measurement procedure cancels the effect of the most significant sources of possible errors. Nomenclature used in equations (16) through (28) is defined in Table 1.

TABLE 1

| | |
|---|---|
| $\alpha$ | Angle between north ($\Omega_H$) and Y torquer axis |
| $\delta$ | Nonorthogonality between Y and X torquer axes |
| $\xi$ | Tilt angle of the spin axis in Y direction |
| $\gamma$ | Tilt angle of the spin axis in X direction |
| $\epsilon_x$ | Gyroscope bias drift rate about the X axis |
| $\epsilon_y$ | Gyroscope bias drift rate about the Y axis |
| | ($\epsilon_x$ and $\epsilon_y$ may represent any drift rate having a large correlation time compared to time $\Delta t$) |
| sfx, sfy | Torquer pulse scale factors |
| $\hat{N}_x, \hat{N}_y$ | Number of pulses accumulated over time $\Delta t$ |
| $\Delta t$ | Pulse accumulation time in each position (0° and 180°) |
| $\Omega_H$ | Horizontal component of earth rate |
| $\Omega_V$ | Vertical component of earth rate |
| $\zeta$ | Excess angle for 180° rotation |

The device is first mounted on a tripod (not shown) and optionally a theodolite may be mounted on surface 50. Preferably, the azimuth orientation of the theodolite has a known relationship with respect to sensitive axes 27 and 29, the X and Y axes of gyroscope 24. Surface 50 is leveled to be substantially horizontal. Float 18 will then level to the sensitive axes 27 and 29 of gyroscope 24.

Next, simultaneous but separate measurements are made of the torque required to maintain the sensitive axes of the gyroscope in a fixed, unchanging relationship with respect to inertial space. It will be recalled that both the horizontal component of the rate of rotation of the earth and any inherent drift of the gyroscope are sensed by the gyroscope about either one or both of its sensitive axes. In the illustrated embodiment, precession of the gyroscope about both sensitive axes is prevented by the counteracting torque applied in digital form. Of course, an analog torquing loop could also be utilized.

The angular rate of rotation sensed about the X and the Y axes is obtained by counting the number of torquing pulses over a unit time period. In the illustrated embodiment, counter 90, see FIG. 8, counts pulses from pulse generator 92 to provide a precise measurement period. Up/down counter 76 counts the number of pulses applied to the X torquer and the number of pulses applied to the Y torquer during a 30 second period. The period of counting may, however be shorter or longer.

The number of pulses applied to the gyroscope with the Y axis in a 0° position is related to the horizontal component of earth rate in the manner set forth in equation (16). This 0° position is defined as the extension of the sensitive axes 27 and 29 in the direction of the +Y and +X axes, except for possible errors as shown in FIGS. 10 and 11, respectively. Each pulse must precess the gyroscope through a certain angle to counteract the precession of that gyroscope by that same angle. The direction of the torquing depends upon the polarity of the pulse. A typical scale factor is approximately 0.04 arc seconds per pulse. In other words, one pulse would precess the gyroscope about the axis to which it is applied through an angle of 0.04 arc seconds. Counter reversing switch 88 is set in the 0° position. In this position the up/down counter counts up in response to a positive pulse and down in response to a negative pulse. Assume that positive pulses counteract precession in the 0° position.

Equation (16) is based upon equation (2) but includes error terms which the simple equation does not include. For example, the term $\Omega_H$ cosine $\alpha$ is resolved through the cosine of the angle $\xi$ if there is any tilt angle of the spin axis in the Y direction. Any such tilt angle would be discovered during a calibration of the device. If a tilt angle exists, then a component of the vertical earth rate, $\Omega_V \sin \xi$, will appear along the Y axis. The term $\epsilon_y$ represents any inherent bias of the gyroscope about the Y axis plus any other noise source. An example of the first and third terms of equation (16) are shown in FIG. 10.

$$\hat{\omega}_{y0} = \frac{sf_y}{\Delta t} \hat{N}_{y0} \simeq \Omega_H \cos\xi \cos\alpha + \epsilon_y + \Omega_V \sin\xi \quad (16)$$

In the same 30 second measuring period, $\Delta t$, the angular rate sensed about the X axis is also measured by counting the number of pulses applied to the X torquer during that period. The relationship between the angular rate sensed about the X axis and the horizontal component of earth rate is set forth in equation (17). Equation (17) is based upon equation (3) but also includes error terms not included in the simple case. The angle $\alpha - \delta$ differs from $\alpha$ by the amount of any nonorthogonality between the Y and the X sensitive axes. The angular rate sensed along the X axis is a cosine function of any tilt angle $\gamma$ of the spin axis in the Y direction. A component of the vertical earth rate is sensed as the function of the sine of any tilt angle of the spin axis in the X direction. The term $\epsilon_x$ represents any gyroscope bias and/or noise sensed by the gyroscope about its X axis. An example of the first and third terms of equation (17) is shown in FIG. 11

$$\hat{\omega}_{x0} = \frac{sf_x}{\Delta t} \hat{N}_{x0} \simeq \Omega_H \cos\gamma \sin(\alpha - \delta) + \epsilon_x + \Omega_V \sin\gamma \quad (17)$$

Next the gyroscope, the float and the inner housing 12 are rotated in azimuth through an angle of 180° by turning thumb wheel 16. The gyroscope is then allowed to stabilize for a few seconds before proceeding with measurements.

Next, the same measurements are repeated for a period of 30 seconds with the X and Y axes in the 180° position with respect to the first measurements. In other words, in the 180° position axes 27 and 29 extend in the opposite directions from the directions shown in FIG. 9. The 180° position is defined as the extension of the sensitive axes 27 and 29 in the -Y and -X directions, respectively, except for error sources shown in FIGS. 10 and 11. The counter reversing switch is switched to the 180° position. In this position, the counter counts down rather than up. In other words, the measurement of the angular rate sensed about the X axis and the 180° position will be subtracted from the angular rate sensed about the X axis and the 0° position and the angular rate sensed about the Y axis in the 180° position will be subtracted from the angular rate sensed about the Y axis in the 0° position. Equations (18) and (19) set forth the relationship between the number of pulses torquing the gyroscope about the X and Y sensitive axes and the component of horizontal earth rate sensed about these axes. Assume that in the zero position positive pulses are generated for torquing about both the X and Y sensitive axes. In the 180° position, the direction of the component of the horizontal earth rate vector is reversed and therefore negative pulses are generated to counteract the effect of these components. In the 0° position up/down counter 76 counted up in response to positive pulses. In the 180° position it will continue to count up in response to negative pulses.

$$\hat{\omega}_{y180} = \frac{sf_y}{\Delta t} \hat{N}_{y180} \simeq \Omega_H \cos\xi \cos(\alpha + \pi + \zeta) + \epsilon_y + \Omega_V \sin\zeta \quad (18)$$

$$\hat{\omega}_{x180} = \frac{sf_x}{\Delta t} \hat{N}_{x180} \simeq \Omega_H \cos\gamma \sin(\alpha - \delta + \pi + \zeta) + \epsilon_x + \Omega_V \sin\gamma \quad (19)$$

Reversing the direction of the counter in the 180° position effectively subtracts the number of pulses counted in the second of the two 30-second periods, i.e., in the 180° position, from the number of pulses counted in the first of the two 30-second periods, while in the 0° position. Equations (20) and (21) represent equation (16) minus equation (18) and equation (17) minus equation (19), respectively. It should be noted that certain error terms cancel because they have the same polarity or direction in both the zero and the 180° positions. The bias terms cancel as do the terms which are a function of the vertical component of the rate of rotation of the earth.

$$\Delta\hat{\omega}_y = \frac{sf_y}{\Delta t} (\hat{N}_{y0} - \hat{N}_{y180}) = \Omega_H \cos\xi \cos\alpha (1 + \cos\zeta) - \Omega_H \sin\alpha \sin\xi \quad (20)$$

$$\Delta\hat{\omega}_x = \frac{sf_x}{\Delta t} (\hat{N}_{x0} - \hat{N}_{x180}) = \quad (21)$$
$$\Omega_H \cos\gamma [\sin\alpha \cos\delta (1 + \cos\zeta) - \cos\alpha \sin\delta (1 + \cos\zeta) + \cos\alpha \cos\delta \sin\zeta + \sin\alpha \sin\delta \sin\zeta]$$

It should be understood that, although the mathematics are being presented in conjunction with the operation of the device, the only mathematical function performed so far in the device is the counting of the pulses in two pulse trains by up/down counter 76 to arrive at a final digital count at the end of the second of the two 30-second periods of measuring. The final counts of the number of pulses torquing the gyroscope about the X and Y axes during the two 30 second periods are related to the sensed components of the horizontal earth rate vector in equations (22) and (23) respectively.

$$\Delta\hat{\omega}_x = \frac{sf_x}{\Delta t} \Delta\hat{N}_x \quad (22)$$

$$\Delta\hat{\omega}_y = \frac{sf_x}{\Delta t} \Delta\hat{N}_y \quad (23)$$

The relationship between the sensed components of the horizontal earth rate vector and the angle $\alpha$ between the Y sensitive axis and true north is set forth above in equation (4). Thus, to solve for the angle $\alpha$, equation (21) is divided by equation (20). Equation (24) results from this division. It is noted that the term $\Omega_H$, which is a function of latitude, has been cancelled by this division as has the time interval $\Delta t$ $$\frac{sf_x}{sf_y} \frac{\Delta\hat{N}_x}{\Delta\hat{N}_y} = \quad (24)$$

$$\cos\gamma \frac{[\tan\alpha \cos\delta (1+\cos\zeta) - \sin\delta (1+\cos\zeta)]}{\cos\xi [1+\cos\zeta - \tan\alpha \sin\zeta]} +$$

$$\frac{\cos\gamma [\cos\delta \sin\zeta + \tan\alpha \sin\delta \sin\zeta]}{\cos\xi [1+\cos\zeta - \tan\alpha \sin\zeta]}$$

Next, a first order approximation is made from the expressions resulting from this division. Any one of the angles $\gamma$, $\xi$, $\delta$, $\zeta$, is much smaller than unity. Equation (24) may of course be solved for $\alpha$ but in practice the insignificant terms are dropped. Thus, equation (24) is simplified to equation (25).

$$\frac{sfx}{sfy} \frac{\Delta \hat{N}_x}{\Delta \hat{N}_y} \approx \frac{\tan(\alpha - \delta + \frac{\zeta}{2})}{1 - \frac{\zeta}{2} \tan \alpha} \quad (25)$$

Equation (24) is solved for tangent α. To simplify calculations, the integrated circuit device 78 divides the final count of pulses torquing about the X axis by the final count of pulses torquing about the Y axis.

$$\frac{sfx}{sfx} \frac{\Delta \hat{N}_x}{\Delta \hat{N}_y} = R \quad (26)$$

$$\tan \alpha \approx \frac{R + \delta - \frac{\zeta}{2}}{1 + R \frac{\zeta}{2}} \quad (27)$$

The angle α is thus equal to the arc tangent of the expression set forth in equation (27).

$$\alpha \approx \tan^{-1} \left[ \frac{R + \delta - \frac{\zeta}{2}}{1 + R \frac{\zeta}{2}} \right] \quad (28)$$

Equation (28) is solved by integrated circuit device 78. The device 78 divides the pulse count for the X axis by the pulse count for the Y axis to obtain the ratio set forth in the left-hand side of equation (26). The value of the angle δ is a fixed error which may be determined during calibration testing of the device. The angle ζ can be measured by calibration testing or adjustable stops could be utilized to provide a precise 180° of rotation.

Of course, the angle α could be derived in terms of an arc cotangent in the manner set forth above.

Integrated circuit device 78 drives angle display 82 through amplifier 80. Angle device 82 comprises light emitting diodes which present for readout the calculated angle α.

Integrated circuit device 78 may also be adapted to solve equation (9) for the angle λ which is the latitude of the point on the surface of the earth where the measurements are taken. The angle α is known from solving equation (28), the earth rate vector Ω has a known value and the component of the earth rate vector sensed about the Y axis, $\Delta \dot{\omega}_y$ is known from equations (20) and (230) and is proportional to $\Delta N_y$. The time $\Delta t$ and torquer scale factor $s_{fy}$ are known quantities.

Using the same small angle approximation as before equation (20) may be written $$\frac{sfx}{\Delta t} \Delta N_y = 2 \Omega_H \cos \alpha$$

or $$\Omega_H = \Omega \cos \lambda$$

$$\cos \lambda = \frac{sfx \, N_y}{2 \Delta t \, \Omega \cos \alpha}$$

The magnitude of the angle λ is obtained by taking the arc cosine defined in equation (9). Angle display 86 also comprises light emitting diodes which present for readout the angle λ.

DESCRIPTION OF A PRIOR ART GYROSCOPE

There is shown in FIG. 12 a cross section of a free-rotor flexure-suspended gyroscope 66, identical to the one described in U.S. Pat. No. 3,943,778. The gyroscope 66 shown in FIG. 12 includes a universal joint 100, a rotor element 102, a drive shaft 104 and an inertial wheel 106. The universal joint 100 interconnects drive shaft 104 and inertial wheel 106. Inertial wheel 106 may be bonded to rotor element 14.

The operating principle of the gyroscope is based on angular decoupling of a spinning gyroscope rotor such as inertial wheel 106 from a driving shaft 104. To understand this concept consider the connection between the wheel and shaft to be a frictionless universal joint. In such a universal joint there would be minimal restraint to angular motion between the wheel and shaft. In addition such a universal joint provides high resistance to translational motion parallel and perpendicular to the spin axis.

When the moment of inertia of each of the gimbal elements is adjusted in accordance with a tuning equation, the spinning rotor is free to deflect through small angles without experiencing reaction torques. Thus a substantially frictionless universal joint is achieved. This concept is explained in more detail below and in U.S. Pat. No. 3,678,764. The dry, i.e.. fluidless, tuned rotor feature eliminates all of the disadvantages of pigtail power leads, mass instability, radiation sensitivity, fluid stratification, gimbal pivots, etc. which are common to fluid-filled gyroscopes.

The inertial wheel 106 is attached to rotor element 102 which is in turn attached by flexures to the two gimbal elements 18 and 20. Gimbal elements 18 and 20 are attached to the drive element 12 with flexure hinges. The inertial wheel 106 and universal joint 10 comprise the entire sensitive element. As shown in FIG. 12, the shaft 104 may be supported by a housing or case 108 with a pair of preloaded ball bearings 110. Ball bearings in this instrument are not part of the sensitive element and therefore have no influence on mass imbalance of the inertial wheel 106.

Capacitance pickoffs comprising a plurality of plates 112, in cooperation with flange 113 of inertial wheel 106, form four capacitor pairs for sensing angular motion of the gyroscope housing relative to the rotor element. The pickoff signals may then be nulled by torquers as described below and servo loops in FIG. 8 thereby providing two axes of inertial stabilization or angular rate measurements. The four capacitance pickoffs are equiangularly spaced aroung the flange 113 (only one pickoff being shown in FIG. 12).

A means for applying eddy current torque to the inertial wheel 106 is shown in FIG. 12. A second conductive flange 114 is positioned around and at the other side of inertial wheel 106. Flange 114 fits into the gaps of four circumferentially symmetrically disposed electromagnets 115a, 115b, 115c, and 115d (only magnet 115d is shown in FIG. 12). Each of the electromagnets has an electric coil which is connected to be controlled by — for example — control means such as computers or servo means (not shown). The coils of the electromagnets are 116a, 116b, 116c and 116d (two of which are shown in FIG. 12). The electromagnets are supported on a bracket attached to housing 108. When it is desired to apply a torque to inertial wheel flange 114 about an axis (not shown) passing through magnets 115a and 115c, magnets 115a and 115c are energized. The eddy currents induced in flange 114 react with the flux field to produce this torque. When it is desired to apply a torque to flange 114 about an axis (not shown) passing through the center of magnets 115b and 115d, magnets 115b and 115d are energized.

Isolation from external magnetic fields is provided by housing 108 which may be made of a high permeability steel.

The spin motor may be a three-phase hysteresis synchronous motor to drive the shaft 104, universal joint 10, and inertial wheel 106 at a desired speed. The spin motor comprises stator windings 117, hysteresis ring 118, and web 119.

I claim:

1. An instrument for providing a signal from which the direction of true month may be determined, said instrument comprising:
    a frame;
    means for sensing the rate of angular motion of the earth about a sensitive axis and for providing an output signal representative of said earth rate;
    means for supporting said sensing means on said frame with a sensitive axis of said sensing means rigidly constrained from any rotation with respect to said frame in any one substantially horizontal first direction, said supporting means including means for isolating said sensing means from small rotations about any horizontal axis of said frame relative to the earth's surface;
    said output signal being indicative of the angle between said first direction and true north; and
    means for establishing a reference horizontal direction with respect to said first direction of the sensitive axis of said sensing means.

2. The apparatus as claimed in claim 1 further including means for selectively rotating said supporting means and said sensing means about the vertical through at least one known angle to constrain the sensitive axis of said sensing means in a substantially horizontal second direction.

3. The apparatus as claimed in claim 2 further including means for temporarily and releasably holding said sensing means in a position with the sensitive axis oriented in said first direction and for temporarily and releasably holding said sensing means in a position with the sensitive axis oriented in said second direction.

4. The apparatus as claimed in claim 3 wherein said holding means is adapted to selectively hold said sensing means with its sensitive axis oriented in any one of a plurality of horizontal directions.

5. The apparatus as claimed in claim 2 further including means for automatically computing angles which is responsive to said measuring means to determine the angle between one of said first and second directions of the sensitive axis and the direction of true north.

6. The apparatus as claimed in claim 1 wherein said sensing means comprises a gyroscope having at least a single degree of freedom and further including means for restraining rotation of said isolating means about the vertical, said gyroscope mounted on said isolating means with its spin axis in a substantially vertical direction.

7. A gyroscopic instrument for determining the direction of true north comprising:
    a frame;
    a gyroscope having two-degrees-of-freedom about two mutually orthogonal sensitive axes, said gyroscope including an inertial wheel, means for detecting angular displacement of said inertial wheel about the sensitive axes and means for torquing the inertial wheel about the sensitive axes, said torquing means responsive to said detecting means to counteract angular displacement of said detecting means about the sensitive axes resulting from at least one component of the horizontal angular rate of rotation of the earth;
    means for supporting said gyroscope on said frame with the spin axis of said gyroscope oriented substantially vertically and the sensitive axes oriented in a substantially horizontal first direction, said supporting means isolating said gyroscope from small horizontal rotations about any horizontal axis of said frame, relative to the earth's surface;
    means for rigidly restraining rotation of said isolating means and said gyroscope about the vertical with respect to said frame;
    means for measuring torque applied to said gyroscope to precess said gyroscope to counteract angular displacement resulting from a component of the rate of rotation of the earth; and
    means for establishing a reference horizontal direction with respect to the direction of at least one of the sensitive axes of said gyroscope.

8. The apparatus as claimed in claim 7 further including means for automatically computing angles responsive to said torquing means to determine the angle between the direction of at least one of the sensitive axes of said gyroscope and the direction of true north.

9. The device as claimed in claim 7 further including means for selectively rotating said isolating means said gyroscope through at least one known angle.

10. The apparatus as claimed in claim 9 wherein the magnitude of said known angle is 180°.

11. The apparatus as claimed in claim 7 wherein said detecting means comprises a first and a second pick-off means, each pick-off means sensing angular displacement of said gyroscope about one of the two sensitive axes of the gyroscope, said first and second pick-off means generating first and second pick-off signals, respectively, in response to angular displacement of said gyroscope about a sensitive axis.

12. The apparatus as claimed in claim 11 wherein said torquer means comprises first and second torquer means, each of said torquer means adapted to precess said gyroscope about one of the two sensitive axes of said gyroscope.

13. The apparatus as claimed in claim 12 further including first and second rebalance circuits, said first rebalance circuit connected between said first pick-off means and said first torquer means for coupling said first pick-off signal to said first torquer means, said torquer means responsive to said first pick-off signal to torque said gyroscope in a direction to null said first pick-off signal, said second rebalance circuit connected between said second pick-off means and said second torquer means for coupling said second pick-off signal to said second torquer means, said second torquer means responsive to said second pick-off signal to torque said gyroscope in a direction to null said second pick-off signal.

14. The apparatus as claimed in claim 13 wherein said first and second rebalancing circuits are digital circuits and said first and second pick-off signals each comprise a pulse train.

15. The apparatus as claimed in claim 14 wherein said automatic computing means comprises means for determining the arc tangent of an angle the tangent of which is the one vector component of earth rate in the direction of one sensitive axis of said gyroscope divided by the other vector component of earth rate in the direction of the other sensitive axis of said gyroscope.

16. The apparatus as claimed in claim 7 wherein said supporting means comprises an inner housing, a flotation fluid contained in said inner housing and a float floating in said fluid wherein said gyroscope is mounted on said float with its spin axis in a substantially vertical orientation.

17. The device as claimed in claim 16 wherein said restraining means is connected between said inner housing and said float.

18. The apparatus as claimed in claim 17 wherein said restraining means comprises at least one diaphragm, said diaphragm connected between said float and said frame to provide high compliance about all axes in a substantially horizontal plane and to provide rigidity about an axis perpendicular to the substantially horizontal plane.

19. The apparatus as claimed in claim 7 wherein said means for establishing a reference direction comprises a mirror mounted on said frame, the plane of said mirror being perpendicular to the direction of one of said sensitive axes.

20. The apparatus as claimed in claim 8 wherein said automatic computing means determines the magnitude of an angle $\alpha$ the tangent of which is equal to one vector component of the horizontal rate of rotation of the earth one sensitive axis of said gyroscope divided by an orthogonal vector component of the horizontal rate of rotation of the earth about the other sensitive axis of said gyroscope.

21. The apparatus as claimed in claim 20 wherein said computing means calculates an arc tangent to determine the angle $\alpha$.

22. The apparatus as claimed in claim 20 wherein said automatic computing means determines an arc cotangent to determine the angle $\alpha$.

23. A method of determining the direction of true north comprising:
    simultaneously rigidly restraining the case of a gyroscope having a substantially vertical spin axis from rotating about the vertical with respect to its frame and isolating said gyroscope from small rotations about any horizontal axis;
    torquing said gyroscope about a substantially horizontal first sensitive axis extending in any substantially horizontal first direction to counteract angular displacement of a case-referenced pick-off about the sensitive axis extending in said first direction which angular displacement would otherwise result from a vector component of the horizontal rate of rotation of the earth about said first axis;
    torquing said gyroscope about a substantially horizontal sensitive second axis extending in a substantially horizontal second direction to counteract angular displacement of a case-referenced pick-off about said second sensitive axis which angular displacement results from a vector component of the horizontal rate of rotation of the earth, said second direction differing from said first direction by a known angle; and
    automatically calculating the direction of true north with respect to said first direction of a sensitive axis from a function of a ratio of the torques required to counteract torques due to the rate of rotation of the earth about said first and second sensitive axes.

24. The method as claimed in claim 23 wherein said gyroscope has at least a single degree of freedom and further comprising the step of rotating said gyroscope about its substantially vertical spin axis through an angle of 90° which additional step is performed after the step of torquing said gyroscope about a sensitive axis in a first direction.

25. The method as claimed in claim 24 wherein said first direction and said second direction differ by 90° and further including after the step of torquing the gyroscope about a sensitive axis in said second direction the additional steps of:
    rotating at least the pickoff and torquer of said gyroscope about the vertical through an angle of substantially 90° to extend said first sensitive axis in a substantially horizontal third direction which differs by substantially 180° from said first direction;
    torquing said gyroscope about said first sensitive axis to counteract the angular displacement resulting from a vector component of the horizontal rate of rotation of the earth about said first sensitive axis extending in said third direction and to cancel any errors in the torquing about said first sensitive axis extending in said first direction due to a gyro bias error and to nonorthogonality between the spin and sensitive axes and to any tilt angle of the spin axis from the vertical or to any tilt angle of the sensitive axis from the horizontal;
    rotating at least the pick-off and torquer of said gyroscope about its spin axis through an angle of substantially 90° to extend said first sensitive axis in a substantially horizontal fourth direction which differs by substantially 180° from said second direction;
    torquing said gyroscope about said first sensitive axis to counteract the angular displacement resulting from a vector component of the horizontal rate of rotation of the earth about said second sensitive axis extending in said fourth direction and to cancel any errors in the torquing about said first sensitive axis extending in said second direction due to a gyro bias error and to nonorthogonality between the spin and sensitive axes and to any tilt angle of the spin axis from the vertical or to any tilt angle of the spin axis from the horizontal; and
    wherein the step of calculating comprises calculating the ratio of the algebraic difference of the counteracting torques applied to said gyroscope about said first sensitive axis in said first and third directions divided by the algebraic difference of the counteracting torques applied to said gyroscope about said first sensitive axis extending in second and fourth directions.

26. The method of claim 25 wherein the step of calculating comprises calculating an arc tangent.

27. The method of claim 25 wherein the step of calculating comprises calculating an arc cotangent.

28. The method as claimed in claim 23 wherein said gyroscope has two degrees of freedom with mutually orthogonal sensitive axes in said first and second directions and wherein the steps of torquing said gyroscope about said first and second sensitive axes extending in said first and second directions are simultaneously performed.

29. The method as claimed in claim 23 wherein said gyroscope has two degrees of freedom and two mutually orthogonal first and second sensitive axes and further including after the steps of torquing said gyroscope about sensitive axes in said first and second directions the additional steps of:
rotating said gyroscope about the vertical through an angle of substantially 180° so that said first sensitive axis extends in a substantially horizontal third direction and said second sensitive axis extends in a substantially horizontal fourth direction, said third direction differing from said first direction by substantially 180° and said fourth direction differing from said second direction by substantially 180°;
torquing said gyroscope about said first sensitive axis extending in said third direction to counteract angular displacement resulting from a vector component of the horizontal rate of rotation of the earth about said first sensitive axis in said third direction and to cancel any errors in the torquing about a sensitive axis extending in said first direction due to a gyro bias error and to nonorthogonality between the spin and sensitive axis and to any tilt angle of the spin axis from the vertical or to any tilt angle of the sensitive axis from the horizontal;
torquing said gyroscope about said second sensitive axis extending in said fourth direction to counteract angular displacement resulting from a vector component of the horizontal rate of rotation of the earth about said second sensitive axis in said fourth direction and to cancel any errors in the torquing about said second sensitive axis extending in said second direction due to a gyro bias error and to any nonorthogonality between the spin and sensitive axes and to any tilt angle of the spin axis from the vertical or to any tilt angle of the sensitive axis from the horizontal; and
wherein the step of calculating the ratio of the algebraic difference of the counteracting torques applied to said gyroscope about said first sensitive axis extending in said first and third divided by the algebraic difference of the counteracting torques applied to said gyroscope about said second sensitive axis extending in said second and fourth directions.

30. The method as claimed in claim 29 wherein the steps of torquing said gyroscope about sensitive axes extending in said third and fourth directions are simultaneously performed.

31. The method as claimed in claim 23 further including the step of calculating the latitude of said gyroscope from a function of the ratio of the rate of rotation of the earth divided by the horizontal rate of rotation of the earth experienced by said gyroscope.

32. A device for measuring the angle between a horizontal direction and the direction of true north comprising:
means for measuring a first component of the horizontal rate of rotation of the earth about an axis extending in a horizontal first direction;
means for measuring a second component of the horizontal rate of rotation of the earth about an axis extending in at least a horizontal second direction, said second direction differing from said first direction by a substantially known angle; and
means for computing the angle between the north direction of the horizontal component of the rate of rotation of the earth and one of said first and second directions from said first and second measured components of the horizontal rate of rotation of the earth.

33. A method of determining the angle between a horizontal direction and the direction of true north comprising:
measuring a first component of the horizontal rate of rotation of the earth about an axis extending in a horizontal first direction;
measuring at least a second component of the horizontal rate of rotation of the earth about an axis extending in a horizontal second direction, said second direction differing from said first direction by a known angle; and
calculating the angle between the north direction of the horizontal component of the rate of rotation of the earth and one of said first and second directions, substantially from a ratio of said first and second measured components of the horizontal rate of rotation of the earth.

* * * * *

UNITED STATES PATENT AND TRADEMARK OFFICE
CERTIFICATE OF CORRECTION

PATENT NO. : 4,123,849

DATED : November 7, 1978

INVENTOR(S) : ROBERT W. MAUGHMER

Page 1 of 4

It is certified that error appears in the above—identified patent and that said Letters Patent is hereby corrected as shown below:

Col. 3, Line 59      Change "secant" to --cosine--.

Col. 4, Lines 59-61      Equation (7) should read:

$$-- \Omega_H = \frac{\hat{\omega}_y}{\cos\alpha} = \frac{\hat{\omega}_x}{\sin\alpha} \quad -- \quad .$$

Col. 5, Lines 9-11      Equation (8) should read:

$$-- \Omega_H = \Omega \cos\lambda \quad -- \quad ;$$

Col. 5, Line 13      After the equal sign and before "the", insert --the magnitude of--;

Col. 5, Lines 16-19,      Change the equation to read:

$$--\cos\lambda = \frac{\hat{\omega}_y / \cos\alpha}{\Omega} \text{ or } \cos\lambda = \frac{\hat{\omega}_x / \sin\alpha}{\Omega} \quad -- \quad ;$$

Col. 5, Lines 23-25      Equation (9) should read:

$$-- \lambda = \text{arc}\cos\left[\frac{\hat{\omega}_y}{\Omega \cos\alpha}\right] \quad -- \quad .$$

UNITED STATES PATENT AND TRADEMARK OFFICE
CERTIFICATE OF CORRECTION

PATENT NO. : 4,123,849
DATED : November 7, 1978
INVENTOR(S) : ROBERT W. MAUGHMER It is certified that error appears in the above—identified patent and that said Letters Patent is hereby corrected as shown below:

Col. 12, Lines 1-4  Equation 18 should read:

$$-- \hat{\omega}_{y180} = \frac{sfy}{\Delta t} \hat{N}_{y180} \cong \Omega_H \cos \xi \cos(\alpha + \pi + \zeta) + \epsilon_y + \Omega_V \sin \xi --\ ;$$

Col. 12, Lines 22-25, Equation 20 should read:

$$-- \Delta\hat{\omega}_y = \frac{sfy}{\Delta t}(\hat{N}_{yo} - \hat{N}_{y180}) = \Omega_H \cos \xi \cos \alpha (1 + \cos \zeta) - \Omega_H \sin \alpha \sin \zeta \cos \xi \quad -- \ ;$$

Col 12, Lines 26-29, Equation 21 should read:

$$-- \Delta\hat{\omega}_x = \frac{sfx}{\Delta t}(\hat{N}_{xo} - \hat{N}_{x180}) = \Omega_H \cos \gamma \left[ \sin \alpha \cos \delta (1 + \cos \zeta) - \cos \alpha \sin \delta (1 + \cos \zeta) + \cos \alpha \cos \delta \sin \zeta + \sin \alpha \sin \delta \sin \zeta \right] --\ .$$

UNITED STATES PATENT AND TRADEMARK OFFICE
CERTIFICATE OF CORRECTION

PATENT NO. : 4,123,849
DATED : November 7, 1978
INVENTOR(S) : ROBERT W. MAUGHMER It is certified that error appears in the above—identified patent and that said Letters Patent is hereby corrected as shown below:

Col 13, Lines 3-7, Equation 25 should read:

$$-- \quad \frac{sfx}{sfy} \frac{\Delta N_x}{\Delta N_y} \cong \frac{\tan(\alpha) - \delta + \frac{\zeta}{2}}{1 - \frac{\zeta}{2} \tan \alpha} \quad -- \quad ;$$

Col. 13, Lines 24-28, equation 28 should read:

$$-- \quad \alpha \cong \arctan \left[ \frac{R + \delta - \frac{\zeta}{2}}{1 + R \frac{\zeta}{2}} \right] \quad -- ;$$

Col. 13, Lines 54-58, the equation should read:

$$-- \quad \frac{sf_y}{\Delta t} \Delta N_y = 2 \Omega_H \cos \alpha \quad -- \quad ;$$

Col. 13, Lines 63-66, the equation should read:

$$-- \quad \cos \lambda = \frac{sf_y}{2 \Delta t \Omega \cos \alpha} \quad -- \quad .$$

UNITED STATES PATENT AND TRADEMARK OFFICE
CERTIFICATE OF CORRECTION

PATENT NO. : 4,123,849

DATED : November 7, 1978

INVENTOR(S) : ROBERT W. MAUGHMER

It is certified that error appears in the above—identified patent and that said Letters Patent is hereby corrected as shown below:

Col. 15, Line 18      Change "month" to --north--.

Col. 16, Line 36,      After "isolating means" insert --and--.

Signed and Sealed this

Twenty-fourth Day of November 1981

[SEAL]

Attest:

GERALD J. MOSSINGHOFF

Attesting Officer     Commissioner of Patents and Trademarks